United States Patent
Kimura

[11] Patent Number: 5,883,698
[45] Date of Patent: Mar. 16, 1999

[54] PHOTOGRAPHIC PRINTER

[75] Inventor: Tsutomu Kimura, Tokyo, Japan

[73] Assignee: Fuji Photo Film Co., Ltd., Kanagawa, Japan

[21] Appl. No.: 958,782

[22] Filed: Oct. 9, 1992

[30] Foreign Application Priority Data

Oct. 9, 1991 [JP] Japan ................................ 3-290986
Dec. 16, 1991 [JP] Japan ................................ 3-332153

[51] Int. Cl.$^6$ .......................... H04N 1/036; G03B 27/52; G03C 7/30
[52] U.S. Cl. ............................ 355/38; 396/311; 358/527
[58] Field of Search ........................ 355/38, 218, 266; 354/105, 106; 358/500, 501, 527; 346/108; 396/310, 311, 313, 315, 318, 319

[56] References Cited

U.S. PATENT DOCUMENTS

| | | |
|---|---|---|
| 4,482,924 | 11/1984 | Brownstein . |
| 4,619,892 | 10/1986 | Simpson et al. ........................ 430/505 |
| 4,929,971 | 5/1990 | Imura et al. ............................ 355/40 |
| 4,958,233 | 9/1990 | Okino . |
| 4,974,096 | 11/1990 | Wash ..................................... 358/302 |
| 5,151,714 | 9/1992 | Okino et al. ............................ 346/108 |
| 5,151,726 | 9/1992 | Iwashita et al. ......................... 355/40 |
| 5,162,843 | 11/1992 | Shiota .................................... 355/40 |
| 5,229,802 | 7/1993 | Shiota et al. ........................... 354/275 |

FOREIGN PATENT DOCUMENTS

| | | |
|---|---|---|
| 0202931 | 11/1986 | European Pat. Off. . |
| 0410376 | 1/1991 | European Pat. Off. . |
| 9004302 | 4/1990 | WIPO . |

Primary Examiner—Safet Metjahic
Assistant Examiner—Michael Dalakis
Attorney, Agent, or Firm—Sughrue, Mion, Zinn, Macpeak & Seas, PLLC

[57] ABSTRACT

A magnetic head and line sensor are mounted along the transport passage of a color negative film. The magnetic head reads trimming information recorded on a magnetic recording layer of the negative film, and sends the trimming information to an image processing unit. The line sensor scans an original frame of the negative film synchronously with the transportation of the film and reads the image data of the frame one line after another. In accordance with the trimming information, the image processing unit generates image data for a trimmed image so as to fully use the width of the color paper, and sends the image data to a line printer unit. The line printer unit scans a light beam synchronously with the transportation of the color paper, to record the trimmed image, one line after another, on the color paper. According to a preferred embodiment of the present invention, at least two layers among cyan, magenta, and yellow coloring layers are made of photosensitive material sensitive to nonvisible electromagnetic waves such as infrared light.

20 Claims, 9 Drawing Sheets

PHOTOGRAPHIC PRINTER

BACKGROUND OF THE INVENTION

1. Field of the Invention

The present invention relates to a photographic printer, and more particularly to a photographic printer for printing an image on a photosensitive material by using a line printer in accordance with image data read from a photographic film.

2. Description of the Related Art

With a conventional photographic printer, an original frame formed on a photographic film such as a color negative film is set at the print station of a film carrier, to print the original frame on a photosensitive material such as color paper. For example, in performing trimming printing, the film carrier is moved in two-dimensions so that an undesired image portion of an original frame is covered by a variable size mask, and the desired trimmed image is printed on a color paper at a predetermined print magnification of a printing lens.

With such a conventional photographic printer, it is necessary to provide a shifting mechanism for moving a film carrier two-dimensionally and a variable size mask for covering an unnecessary image portion. The structure of the printer therefore becomes complicated, resulting in a large and expensive printer. Furthermore, a conventional photographic printer performs frame by frame exposures for exposing a color paper with light passed through a negative film, and the photographic process for a color paper is a continuous process wherein the color paper is transported through various processing baths. Accordingly, in a mini-lab type printer processor, a loop forming unit for reserving a loop of an exposed color paper in order to accommodate a length thereof corresponding to a processing speed difference (i.e., the difference between the rate of travel of the paper through the printer and the rate of travel through the processor) is mounted between a printer unit and paper processor unit. The need for the loop forming unit makes it difficult to construct a compact photographic printer. Also, the conventional photographic printer prints color paper by passing light through a negative film, posing a problem of color crosstalk and making it difficult to obtain an image of high color saturation.

SUMMARY OF THE INVENTION

It is a principal object of the present invention to provide a photographic printer, which has a simple structure is low in cost, and is capable of performing trimming printing.

It is another object of the present invention to provide a photographic printer capable of automatically performing trimming printing.

It is a further object of the present invention to provide a photographic printer capable of making photoprints with minimal color crosstalk and a high color saturation.

In order to achieve the above and other objects, a photographic printer according to the present invention is constructed of a trimming information inputting unit, an image reading unit, an image processing unit, and a line printer. The trimming information inputting unit writes trimming information, for example, on a magnetic recording layer of a photographic film at the time of taking a photograph or at the time of receiving a DP (Developing/Printing) order, and reads it with a magnetic head at the time of printing. Alternatively, trimming information is entered from a keyboard at the time of inspecting a negative film, and written on the magnetic recording layer or in an LSI card associated with the film cassette or the printer.

The image reading unit reads an original frame recorded on a photographic film, and outputs first image data in an analog or digital form. This first image data is processed into second image data by the image processing unit, in accordance with the trimming information, by enlarging the image so as to make a side of the trimmed image equal to a width of the photosensitive material. The second image data is sent to the line printer which prints the trimmed image on a photosensitive material. The printed image is then processed According to a preferred embodiment of the present invention, infrared photosensitive materials sensitive to infrared rays other than visible light are used for at least two of the three photosensitive layers of the paper. The infrared photosensitive material has less color crosstalk, allowing an image of high chroma to be created on the photosensitive material. If infrared photosensitive material is used for all three layers, it is possible to print an image in a light room, without the need for a light shielding structure for the photographic printer, thus simplifying the printer structure.

According to another preferred embodiment of the present invention, the photographic printer is integrally provided with a film processor unit. During the photographic process of a photographic film or immediately thereafter, the image reading unit reads an image of an original frame. Such an integrated structure of the film processor and printer processor allows both development of a negative film and printing of an image on a color paper to be accomplished by a single apparatus, thereby saving the installation and maintenance cost of a laboratory. Moreover, the photographic processes for a negative film and color paper can be executed in parallel, reducing the required time for making photoprints.

According to the present invention, a line printer is activated to create an image on a photosensitive material based upon image data read from a photographic film. Therefore, printing on a photosensitive material can be executed at the same continuous speed as that of development of the photosensitive material. Accordingly, it is not necessary to provide a conventional loop forming unit for a photosensitive material resulting in a compact printer of a simple structure. Since image data is electrically processed in accordance with trimming information, even a printer of a simple mechanical structure can make trimmed prints.

BRIEF DESCRIPTION OF THE DRAWINGS

The above objects and advantages of the present invention will become more apparent upon reading the detailed description of the embodiments in connection with the accompanying drawings in which.

DETAILED DESCRIPTION OF THE PREFERRED EMBODIMENTS

Figure 1:
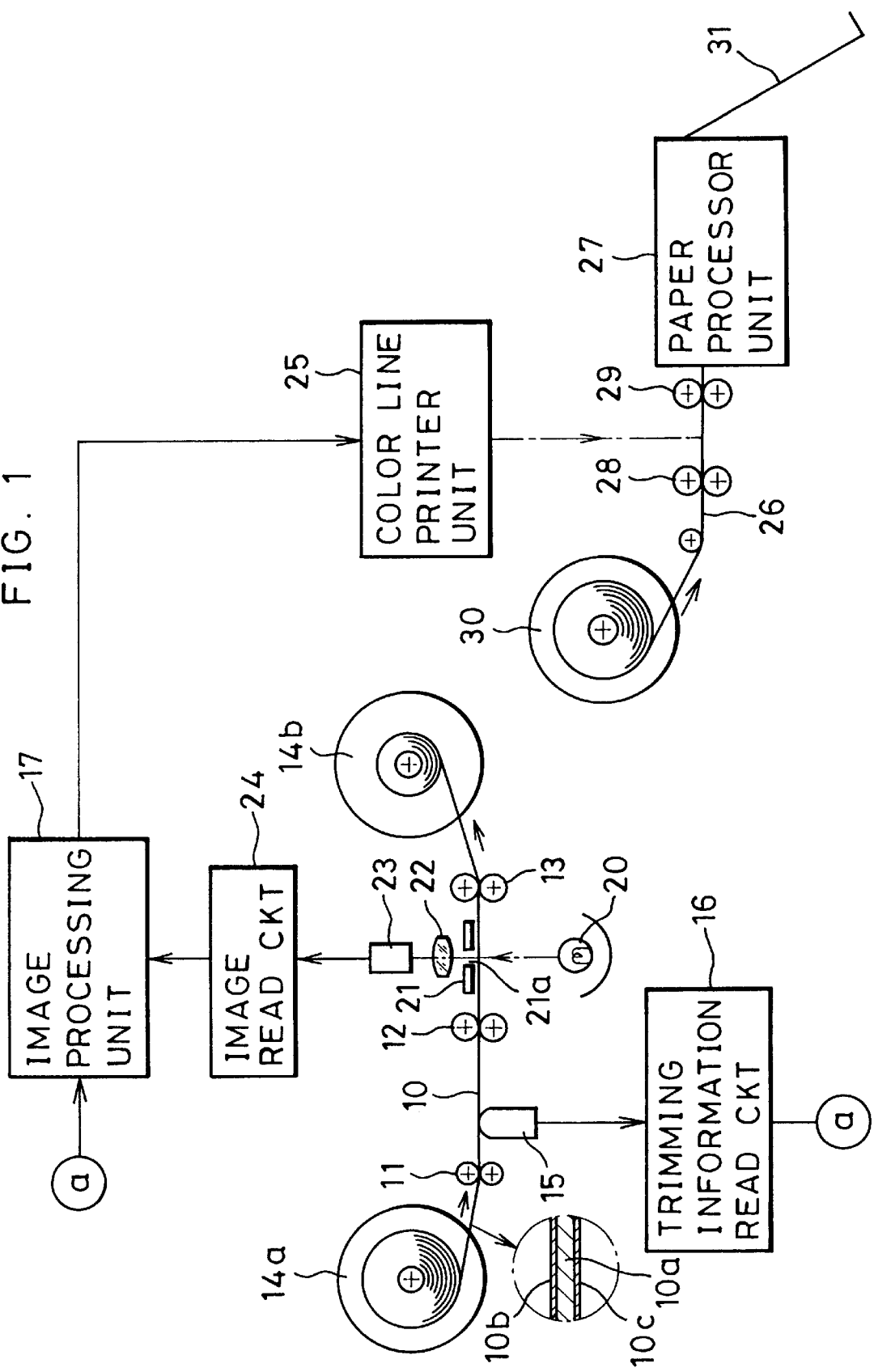
FIG. 1 is a schematic diagram showing a first embodiment of a photographic printer according to the present invention.

FIG. 1 illustrates a mini-lab type photographic printer having a paper processor unit 27. A developed photographic film such as a color negative film 10 is transported from a supply reel 14a to take-up reel 14b via feed roller pairs 11, 12, and 13. A plurality of the negative films are spliced to one another so as to form a long spliced film. The negative film 10 has a base 10a, a photosensitive emulsion layer 10b formed on one surface of the base 10a and having original image frames recorded therein, and a magnetic recording layer 10c formed on the opposite surface of the base 10a. A magnetic head 15 is mounted in contact with the negative film 10 at the position between the feed roller pairs 11 and 12. While the negative film 10 is transported, the magnetic head 15 reads information recorded on the magnetic recording layer 10c. A trimming information read circuit 16 converts an electric signal from the magnetic head 15 into trimming information, and inputs it to an image processing unit 17.

A light source 20 is mounted at a position between the feed roller pairs 12 and 13, to radiate light toward the negative film 10 from below. An image pickup unit (i.e. reading unit) is mounted above the negative film 10 at the position directly opposite the light source 20. The image pickup unit may be a color image area sensor unit for picking up an entire original frame at one time, or a color image line sensor unit for reading an image line by line in concert with the transportation of the negative film 10.

In this embodiment, a color image line sensor unit is used as the image pickup unit. This sensor unit has a slit plate 21, a lens 22, and a CCD or MOS type image line sensor 23. The slit plate 21 has a narrow slit 21a formed therein in the widthwise direction of the negative film 10. An original frame on the negative film 10 is illuminated by the light source 20 and is focussed as a line onto the image line sensor 23 via the slit 21a and lens 22. The image line sensor 23 has three pixel columns, and R, G, and B color filters mounted on each pixel column. An image read circuit 24 derives three color analog image data, based upon the output of line sensor 23, corresponding to the original frame, synchronously with the film advance, and sends the three color image data (i.e. first data) to the image processing unit 17.

The image processing unit 17 receives the trimming information and image data. According to the trimming information, the image is enlarged so as to make the upright side of the image to be trimmed equal to the width of the color paper 26. The image data as outputted from the image processing unit 17 is sent to a color line printer 25. The color line printer 25 modulates the intensities of three laser beams in accordance with the three color image data, and combines three laser beams into a single laser beam. This single laser beam is scanned in the main scanning direction (the widthwise direction in this embodiment) of a photosensitive material such as the color paper 26. Sub scanning is achieved by advancing the color paper 26, pulled out of a supply reel 30 by feed roller pairs 28 and 29, at the same speed as that of the processing speed of the paper processor unit 27. The printed color paper 26 is then transported to the paper processor unit 27 to be developed. The developed color paper 26 is cut into frames and ejected out onto a tray 31 as is well known in the art. If the image processing unit 17 has a memory capable of storing image data and trimming information corresponding to more than one frame at a time, a transporting speed of the color paper 26 may differ from that of the negative film 10.

Figure 2:
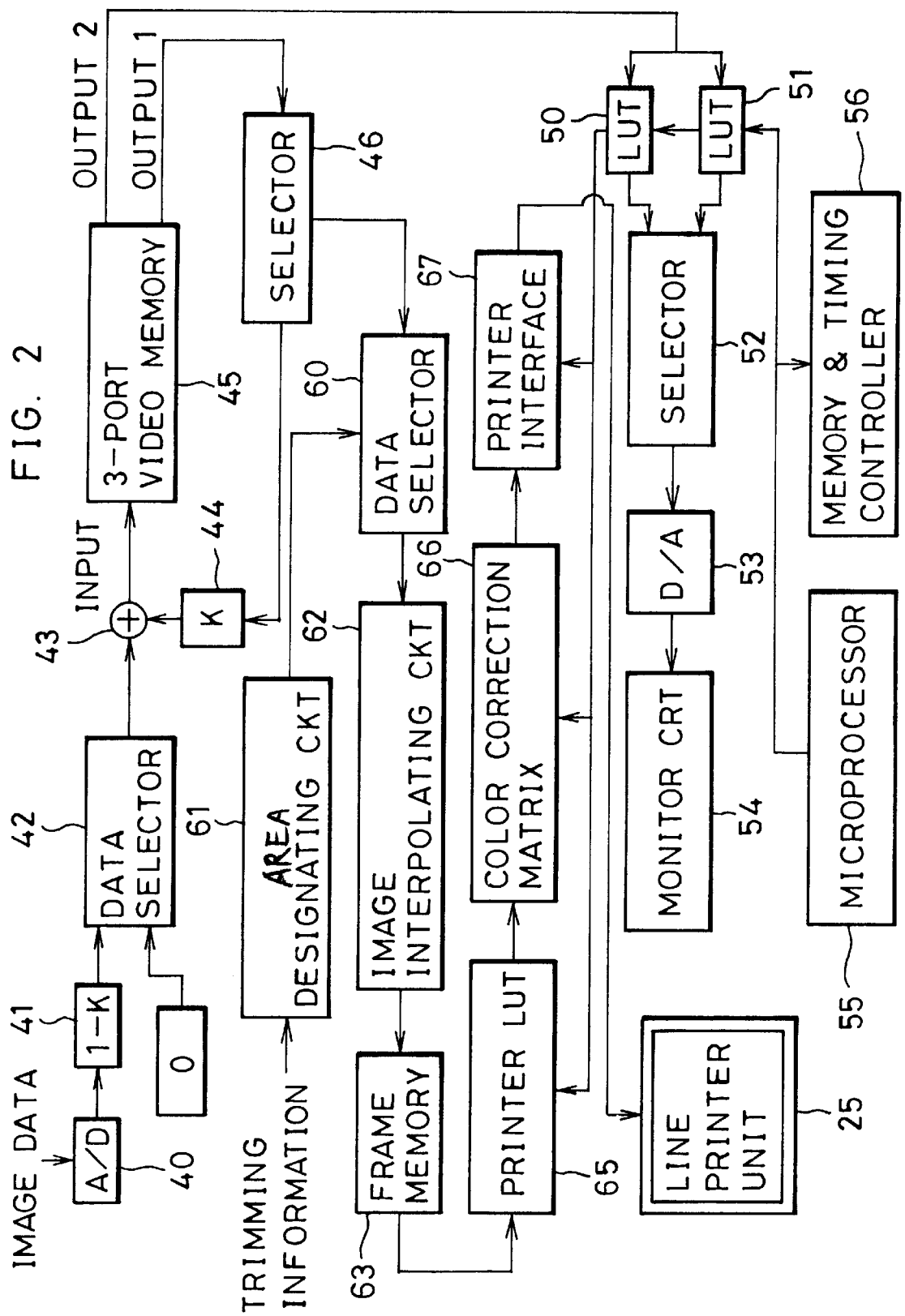
FIG. 2 is a block diagram showing an example of the image processing unit.

FIG. 2 is a block diagram showing the image processing unit 17. Three color image data from the image read circuit 24 is digitalized by an A/D converter 40, and inputted to a multiplier 41. The multiplier 41 multiplies the input three color image data by a coefficient (1−K) for noise elimination. This image data is then inputted via a selector 42 to an adder 43 to be added to the data from a multiplier 44, the result being supplied to a three-port video memory 45. This video memory 45 outputs two types of image data, each having a different transfer speed, so that the image data can be outputted at the same time at peripheral terminal apparatuses having different transfer speeds (e.g., a CRT display and a photographic printer). The image data having a slower transfer speed is called output 1, and that having a faster transfer speed is called output 2. The output 1 is provided with two transfer speeds, one being the same as that of an input from the image pickup unit and the other being used for the printer. The output 2 is provided with a transfer speed which is appropriate for a CRT display.

The image data output 1 is supplied to the multiplier 44, multiplied by a coefficient K for noise elimination, and inputted to the adder 43. The image data output 1 inputted to the multiplier 44 is the image data corresponding to one frame before the image data from the data selector 42. In this manner, noise components of the image data are eliminated. The coefficient K of the multiplier 44 may be set to "1" and the input data at a desired area may be set to "0" at the data selector 42. In this case, the selector 46 operates to select the output 1 only for the above-described desired area. If the transfer speed of the output 1 is doubled and the image data output 2 is thinned every second pixel and inputted to the adder 43, the image one frame before is reduced to a half size and superposed within the current frame image at the above-described desired area (called a picture-in-picture). If the image data is not thinned and the write area is controlled, it is possible to display the same image side by side in one frame.

The image data output 2 is subjected to gamma correction, and the like, at look-up table memories 50 and 51 (hereinafter called LUT). The corrected image data is then supplied via a selector 52 to a D/A converter 53, converted into an analog signal, and supplied to a monitor CRT 54. LUTs 50 and 51 are used independently for the color tone correction of the current frame image and inserted image during the picture-in-picture mode, to display them on the monitor CRT 54. In this manner, the image before color correction (image reduced in size) and the image after color correction can be compared in real time.

LUTs 50 and 51 are made of high speed memories, and written with predetermined data at each address in advance under the control of a microprocessor 55, to allow color tone conversion. In addition to the renewal of data in LUTS, the microprocessor 55 controls the renewal of coefficients of a color correction matrix and multipliers. Reference numeral 56 represents a memory and timing controller.

In transferring the freeze image data to the line printer, this image data is read from the video memory 45 as the image data output 1. The image data output is sent from the selector 46 to a data selector 60. An area designating circuit 61 is connected to the data selector 60. The area designating circuit 61 receives the trimming information, and sends address information representing a trimmed area of the image data to the data selector 60. In accordance with the address information from the area designating circuit 61 and the image data from the video memory 45, the data selector 60 sends the image data within the designated area to an image interpolating circuit 62.

The image interpolating circuit 62 interpolates and magnifies the image data from the data selector 60 so as to make the trimmed image size match the width of the color paper. The trimmed and magnified image data is stored in a frame memory 63. The image data from the frame memory 63 is subjected to tone conversion by correction data from an LUT 65. Correction data stored in this LUT 65 is renewed by input data from keyboard, or the like. The tone converted image data is corrected by a color correction matrix circuit 66 so as to match the color characteristics of the color paper. The corrected image data is then supplied via a printer interface 67 to the line printer unit 25. It is important to note that the image data may be corrected for any one of a number of factors which affect print quality, such as temperature or photographic taking lens speed, for example.

Figure 3:
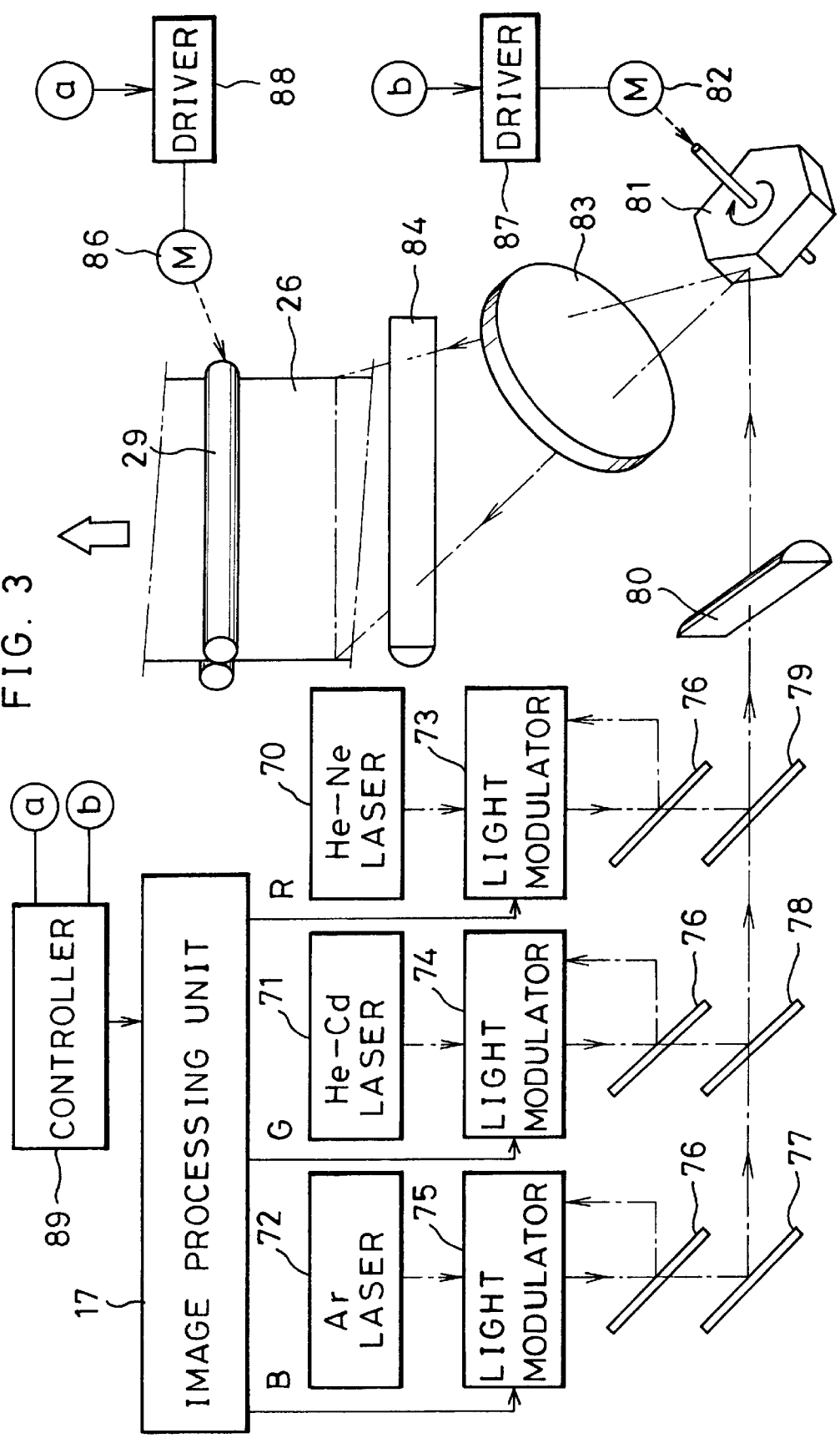
FIG. 3 is a schematic diagram showing an example of a line printer.

Referring to FIG. 3, the line printer unit 25 has a He—Ne laser 70 for radiating red light, He—Cd laser 71 for radiating green light, and Ar laser for radiating blue light. Laser beams from the laser devices 70 to 72 are modulated by light modulators 73, 74, and 75, respectively, in accordance with the image data from the image processing unit 17. In order to check at the start of printing whether the intensities of the laser beams are proper, a portion of the laser beams are picked up by splitters 76 and fed back to the light modulators 73 to 75. Instead of gas lasers, semiconductor lasers, or any other appropriate light sources, may also be used.

The laser beams, modulated in accordance with the image data, are converted into a single beam by means of a mirror 77, and dichroic mirrors 78 and 79. This single beam is changed to a parallel beam by a known collimator optical system (not shown), and thereafter directed to fall incident upon a polygonal mirror 81 via a cylindrical lens 80. The polygonal mirror 81 is rotated by a motor 82 at a high speed so that the laser beam is moved in the widthwise direction of the color paper 26, performing one main scanning per each face of the polygonal mirror 81. The laser beam deflected by the polygonal mirror 81 is converged to a spot having a beam diameter corresponding to the pixel density, by a focussing optical system consisting of a lens 83 and cylindrical lens 84, and applied to the color paper 26.

A paper feed roller pair 29 rotated by a motor 86 feeds the color paper 26 in the sub scanning direction synchronously with the main scanning of the laser beam. The motors 82 and 86 are driven by drivers 87 and 88, respectively, and controlled by a controller 89. The controller 89 controls the rotation of the motors 82 and 86 in response to a synchronizing signal from the image processing unit 17. With the sub scanning by the paper feeding and the main scanning by the laser beam, the trimmed image is exposed on the color paper 26. Instead of printing an image on the color paper 26 by using a laser beam, a flat CRT or liquid crystal type line printer or other appropriate device may also be used.

Figure 4:
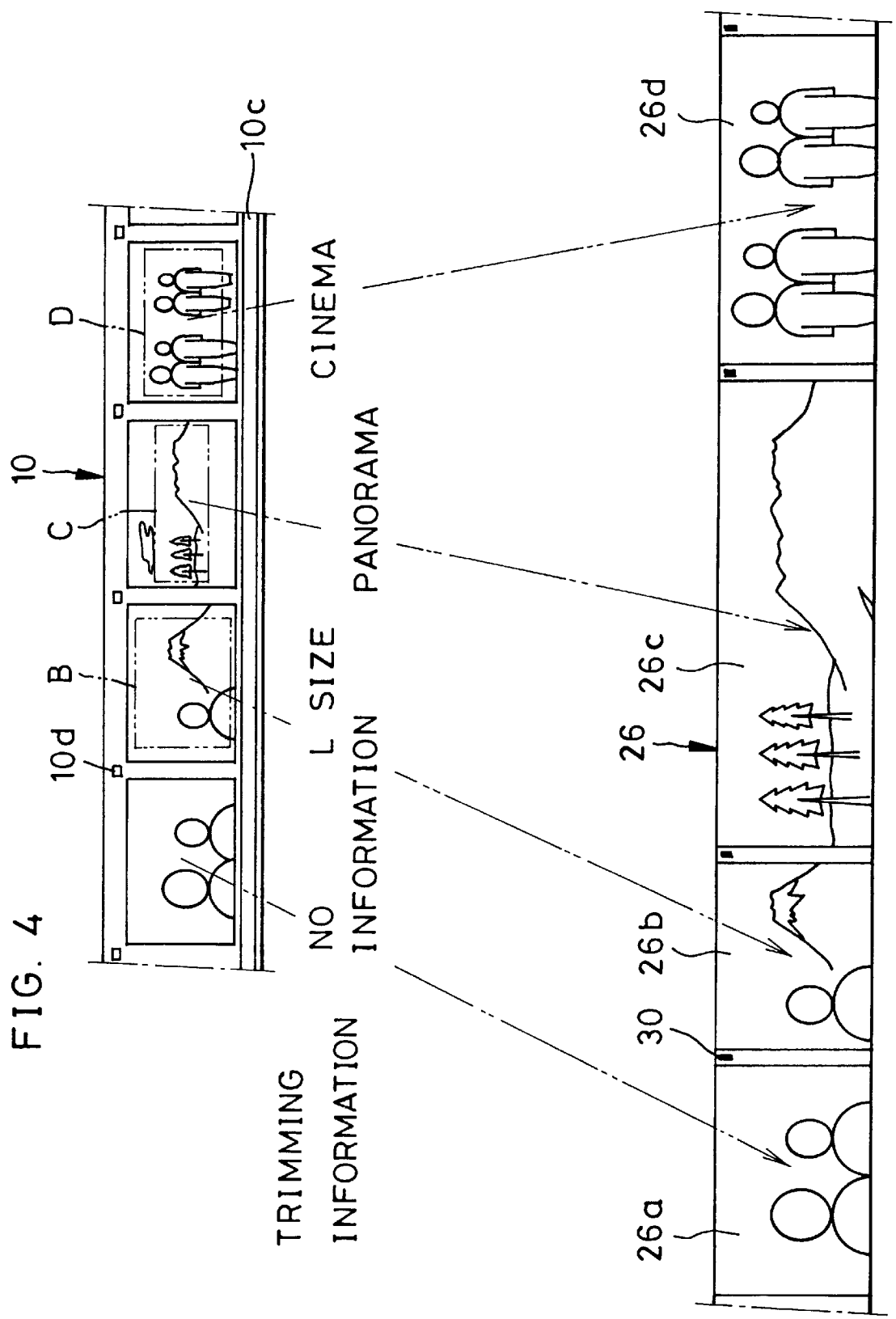
FIG. 4 shows a negative film and corresponding trimmed prints.

As shown in FIG. 4, in addition to printing an image on the color paper 26, the line printer unit 25 prints cut-marks 30 on the marginal areas between print frames of the color paper 26. By detecting these cut marks 30, the paper processor unit 27 cuts the dried color paper 26 into print frames with a cutter. Instead of the cut-marks, small punched holes may also be used.

FIG. 4 shows the original frames of a negative film and their corresponding print frames of a color paper. Trimming information in the form of code is recorded on the magnetic recording layer 10c of a negative film 10, when photographing a picture with a camera or accepting a DP order by using an order recording machine. Perforations 10d are formed in the negative film for positioning and aligning a frame with an exposure opening during photographic or printing exposure. In this embodiment, the trimming information is a no-designation, an L size, a panorama size, or a cinerama size. In accordance with the trimming information, the image processing unit 17 and line printer unit 25 create trimming images (print frames) 26a, 26b, 26c, 26d extending across the full width of the color paper 26.

In this embodiment, for the no-designation, a full size image is printed on the color paper 26 to create an image 26a having a high definition television (HDTV) size (89×158 mm, aspect ratio 1.78). For the L-size designation, an image surrounded by a trimming frame line B is printed on the color paper 26 to create an image 26b having a conventional L size (89×130 mm, aspect ratio 1.46). For the panorama size designation, an image surrounded by a trimming frame line C is printed on the color paper 26 to create an image 26c having a panorama size (89×254 mm, aspect ratio 2.85). For the cinerama size designation, an image surrounded by a trimming frame line D is printed on the color paper 26 to create an image 26d having a Cinerama size (89×205 mm aspect ratio 2.30). Other designations for creating a photoprint having a square size (89×89 mm, aspect ratio 1.0) or photoprints of other sizes may also be used. Furthermore, original frames having different sizes may be created on a single negative film, by using a changeable mask of a camera, so as to make the printing aspect ratio equal to the taking aspect ratio.

Figure 5:
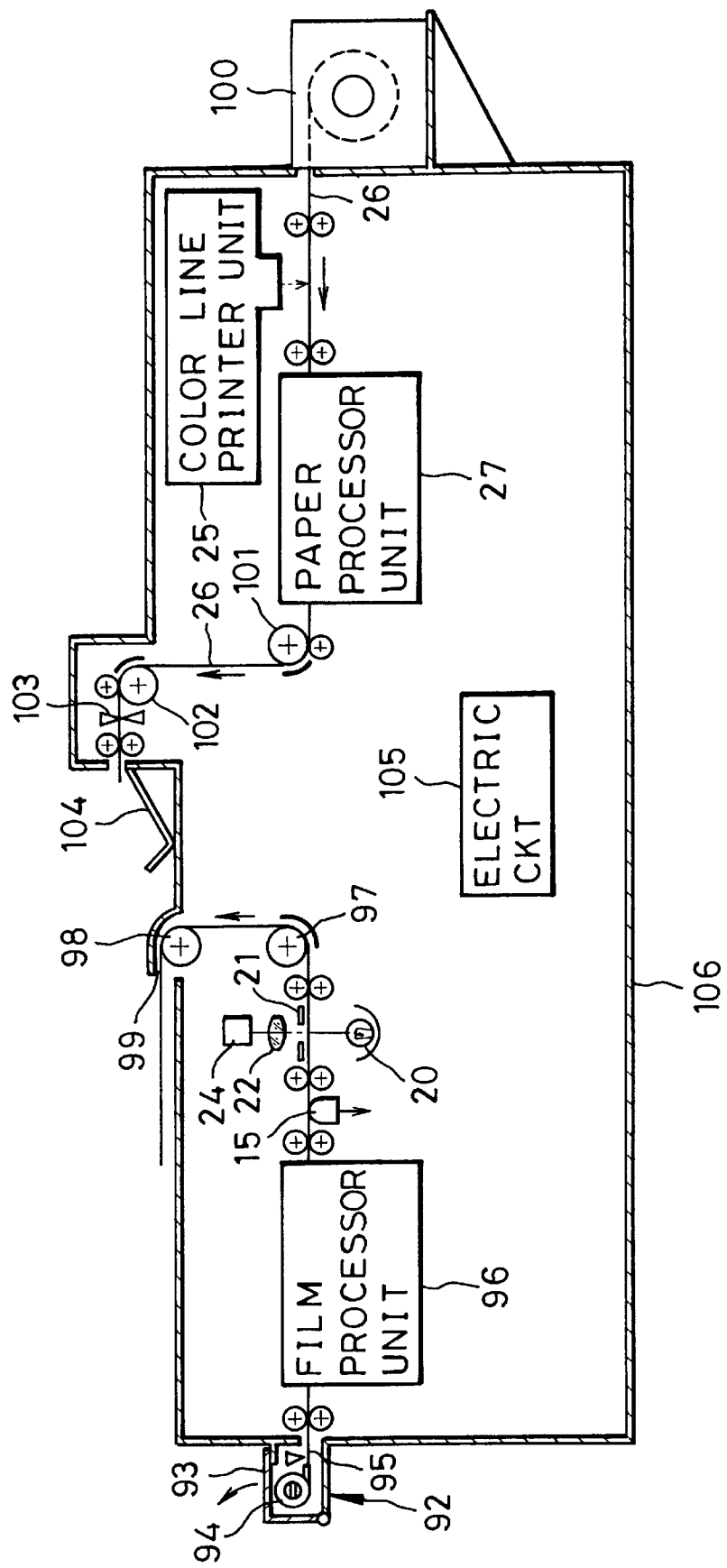
FIG. 5 is a schematic diagram showing a photographic printer having a negative film processor unit.

FIG. 5 shows a photographic printer having a film developing unit and paper developing unit integrally mounted. Like elements to those shown in FIG. 1 are represented by identical reference numerals. A film pull section 92 has a cover 93 which is pivotable in the direction indicated by an arrow so that a film cassette 94 can be loaded therein or dismounted therefrom. An exposed negative film 95 is pulled out of the film cassette 94, the trailing edge portion of the film being cut with a cutter. The negative film 95 is sent to a film processor unit 96 to be developed. The trimming information of the developed negative film 95 is then read by the magnetic head 15 and the image data is read by the line sensor 24, and thereafter the negative film 95 is ejected out from an outlet 99 by means of rollers 97 and 98.

A color paper 26 is pulled out of a paper magazine 100, and transported to the a paper processor unit 27 at a speed determined from the print magnification factor indicated by the trimming information and the transportation speed of the negative film 95. During this transportation, the color line printer unit 25 prints a trimmed area of the original frame on the color paper 26 at a predetermined print magnification factor. After this exposure, the color paper 26 is developed by the paper processor unit 27. The developed color paper 26 is transported to a cutter 103 via rollers 101 and 102 to be cut into frames and ejected out onto the tray 104. Reference numeral 105 represents an electric circuit such as a controller for controlling the image processing unit and other circuits. Reference numeral 106 represents a casing of the photographic printer. With this photographic printer, it is possible to quickly deal with an urgent DP process order, reducing a customer waiting time. If the film processing system and paper processing system are disposed side by side, the length of the casing 106 can be shortened although the width becomes larger.

Figure 6:
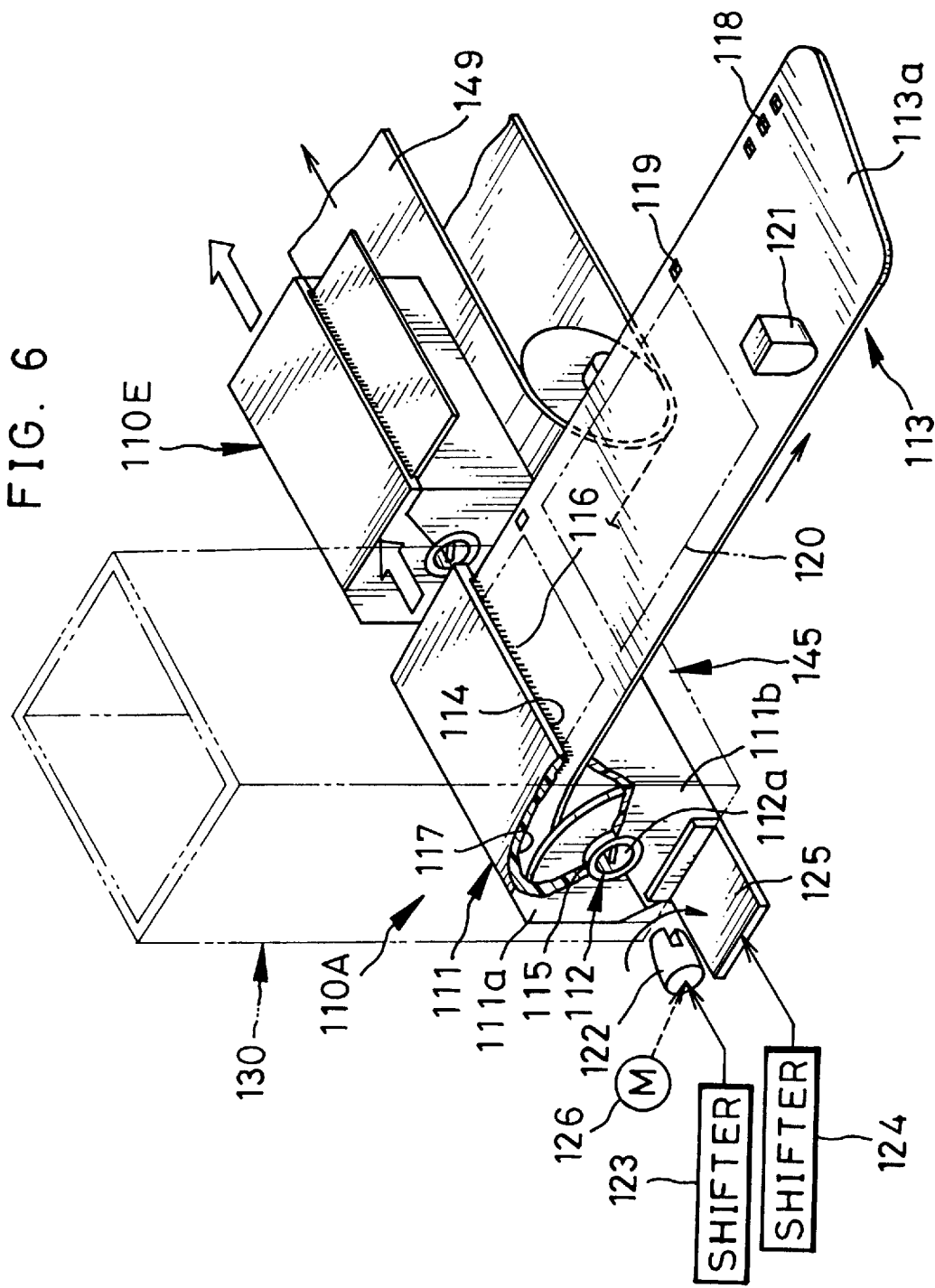
FIG. 6 is perspective view of a film pull section according to second embodiment of the present invention.
Figure 7:
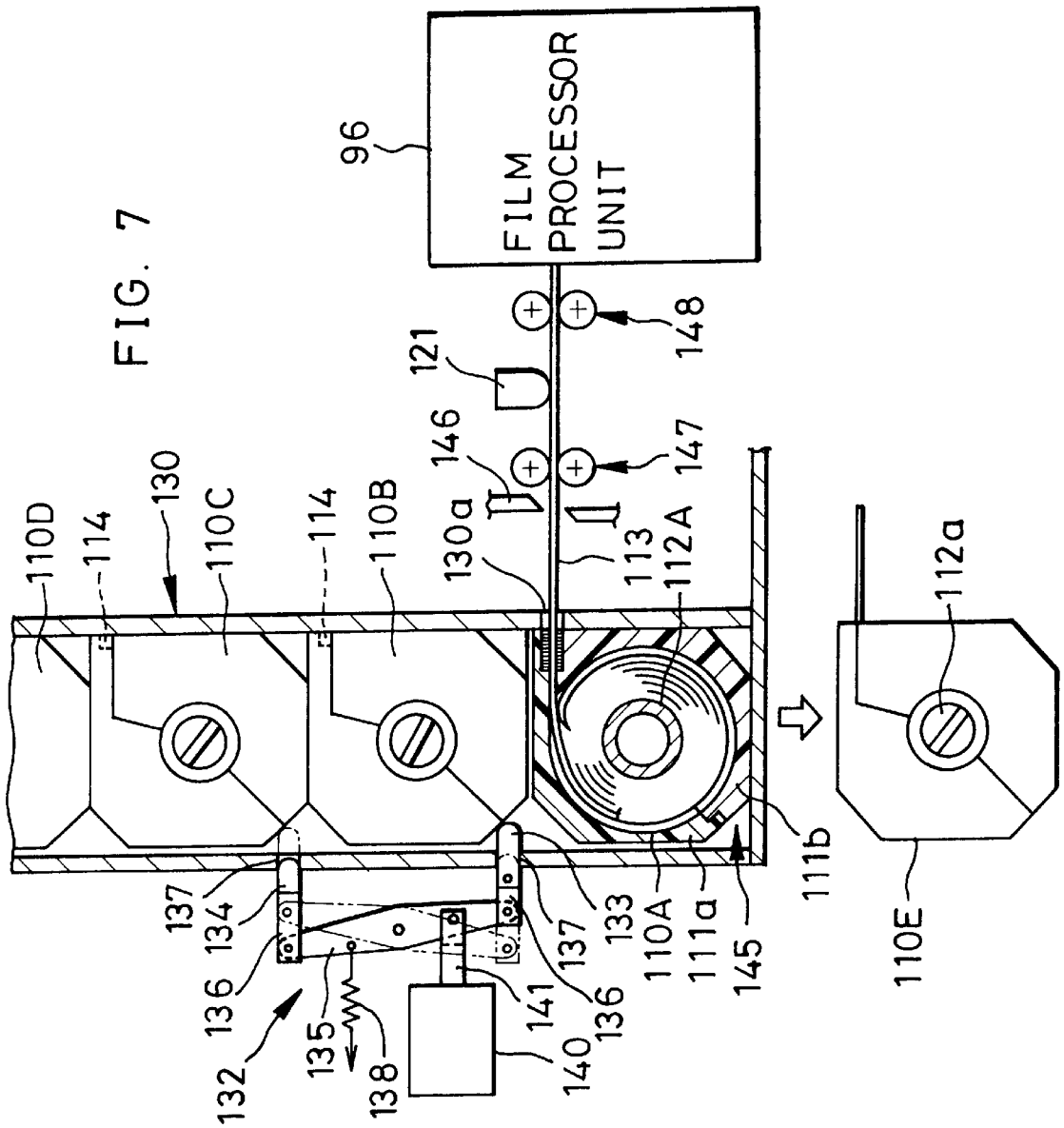
FIG. 7 is a schematic view of the film pull section shown in FIG. 6.

FIGS. 6 and 7 show a structure of a film pull section where a film cassette of a leader-advancing type is loaded. The film pull section 92 of FIG. 5 can be replaced thereby. In FIG. 6, a film cassette 110A is constituted by a cassette shell 111, a spool 112 rotatably supported in the cassette shell 111, and exposed negative film 113 wound about the spool 112 with the film trailer fixed thereon.

The cassette shell 111 is formed by joining shell halves 111a and 111b molded from synthetic resin. The cassette shell 111 is provided with a film passage mouth 114 for passing the photographic film 113, and openings 115 for supporting the spool 112 and for exposing a coupling end 112a to the outside. Plush, or light trapping fabric, 116 is attached to the film passage mouth 114. A film containing chamber 117 has two arcuate ridges formed on inside surfaces thereof. When the spool 112 is rotated, the roll of the negative film 113 is prevented from loosening. Alternatively the film roll may be nipped by a pair of flanges of the spool 112.

When the spool 112 is rotated in the film unwinding direction by inserting a fork 122 in the coupling end 112a, a leading end of the negative film 113 is guided by the ridges, and is advanced to the outside of the film passage mouth 114.

The film pull stage 145 is provided with the fork 122 which is slidable in the axial direction of the spool 112. A shifter 123 shifts the fork 122 in the axial direction to displace it from a retracted position to a position for engaging the fork 122 with the coupling end 112a of the spool 112. A motor 126 rotates when the engaging position is taken so as to rotate the spool 112 in the unwinding direction, and thus advance the film leader 113a outside the film cassette 110A.

A plurality of perforations 118 are formed in a film leader 113a of the negative film 113 to engage a film threading member of the camera for feeding the film leader 113a to the take-up spool after being let out of the cassette shell 111. A film main portion of the negative film 113 is provided with positioning perforations 119, one for each of the frames 120 to be exposed. The perforations 119 are detected, either mechanically or optically, in order to position each of the frames 120 to be exposed on an aperture of the camera. The negative film 113 is provided with a transparent magnetic recording layer, on which trimming data is recorded, and from which the data is read out by a magnetic head 121. Note that the magnetic layer may be formed alternatively in a form of a belt along a longitudinal edge of the negative film 113. The film cassette 110A may also be provided with a magnetic tape or IC memory and the trimming data may be written therein during exposure.

In FIG. 7, a cassette holder 130 is formed in the shape of rectangular elongated box, in which a plurality of film cassettes 110A to 110D are contained with their film passage mouth 114 directed in the same direction. The lower portion of the cassette holder 130 is provided with a cassette feeding mechanism 132 which includes lower and upper stopper pins 133, 134 which project retractably into the cassette holder 130. The stopper pins 133, 134 are supported swingably on both ends of an arm 135 by means of connecting members 136, and project alternately into the cassette holder 130 through guide holes 137 in correspondence with a displacement of the arm 135. A coiled spring 138 biases the arm 135 so that the lower stopper pins 133 project into the cassette holder 130.

A solenoid 140, connected to the arm 135 by means of a plunger 141, displaces the arm 135, when energized, in order to alternate projection of the stopper pins 133, 134. A single film cassette 110B, positioned by itself between the lower and upper stopper pins 133 and 134, falls on a film pull stage 145. After the cassette falls, the solenoid 140 is deenergized to return the arm 135 to the home position indicated by the solid line by means of the coiled spring 138. Of course, instead of using the stopper pins linked by the arm 135 to position the film cassette 110B, the stopper pins may be driven separately by using two solenoids or the like.

A passage mouth 130 is formed in front of the cassette holder 130. An opening, for ejecting the film cassette 110E after it has been emptied of the negative film, is formed in the lateral side of the cassette holder. A cutter 146 is adapted to cut the film trailer.

Drawing rollers 147 then start rotating to feed the exposed negative film 113 to the feeding rollers 148. The exposed negative film 113 is fed in a film processor unit 96 by the drawing and feeding rollers 147 and 148.

A cassette ejecting mechanism, constituted by an ejecting bracket 127 and a shifter 124 for shifting the ejecting bracket 127 in the axial direction of the spool 112, ejects the emptied cassette 110E, which has been separated from the exposed negative film 113, to shift it from the film pull stage 145 to a cassette conveyor 149, which consists of conveyor belts for conveying the emptied cassette shell 110E to a hopper.

The operation of the present embodiment will now be described. First, the film cassettes are inserted in the cassette holder 130 as shown in FIG. 7. A plurality of film cassettes 110A to 110D are stacked on top of each other in the cassette holder 130 in a state so as to be stopped by the lower stopper pins 133. The solenoid 140 of the cassette feeding mechanism 132 is actuated so that the single film cassette 110A between the stopper pins 133 and 134 is positioned in the film pull stage 145. The fork 122 is shifted axially by the shifter 123 as shown in FIG. 6. While the fork 122 is coupled with the coupling end 112a, the motor 126 is rotated to rotate the spool 112 in the unwinding direction to advance the film leader 113a. The exposed negative film 113 with the film leader 113a advanced is fed along the feeding passage as shown in FIG. 7. The rotation of the drawing and feeding rollers 147 and 148 is controlled in order to store the exposed negative film 113 between the rollers 147 and 148 at a length corresponding to the time necessary to cut the film trailer, and then in order to feed the exposed negative film 113 into the film processor unit 96.

The emptied cassette shell 110E is ejected from the film pull stage 145 to the cassette conveyor 149 by the cassette ejecting mechanism. Then, the emptied cassette shell 110E is fed to the hopper.

The color paper of the above-mentioned embodiment has a multi-layer structure having red, green, and blue photosensitive layers respectively sensing visible red, green, and blue lights, as is well known in the art. Such a conventional color paper generates color crosstalk because the wavelength ranges of photosensitive layers partially overlap each another. Color crosstalk makes it impossible to create an image with high chroma on a color paper. This problem can be solved by using a color paper wherein at least two layers of the three layers sense electromagnetic waves other than visible light.

Figure 8:
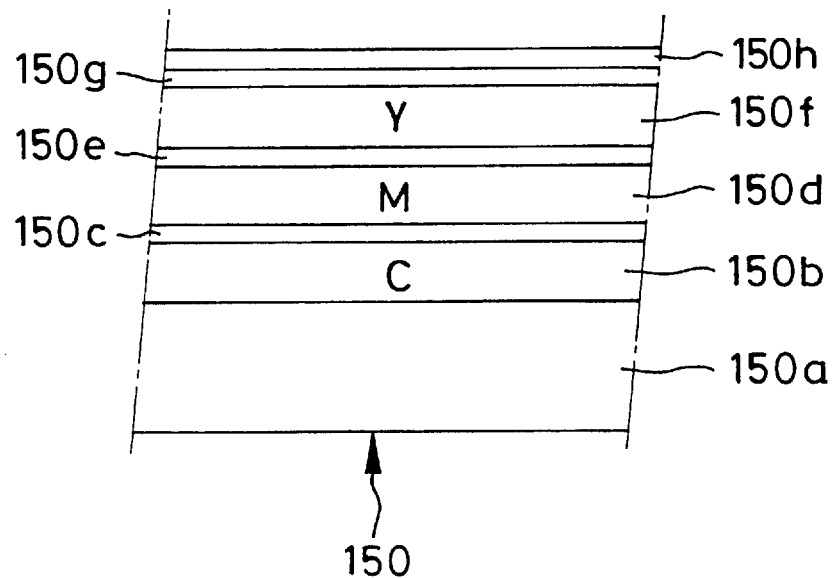
FIG. 8 is a diagram showing an example of the layer structure of infrared photosensitive material.

FIG. 8 shows the layer structure of a color paper having three layers sensitive to infrared light. This color paper 150 has a resin coating paper (RC paper) 150a on which layers 150b to 150h are formed in this order. Each sensitive layer has a different wavelength sensitivity to light and a different exposure amount necessary for coloring. As a result, it is possible to eliminate color crosstalk by controlling the wavelengths and intensities of infrared light radiated from radiation sources. Such an infrared photosensitive material is disclosed in U.S. Pat. No. 4,619,892. Infrared light lamps or infrared light emitting diodes having light emission peaks at 780 nm, 830 nm, and 880 nm are used as the three light sources in place of the lasers illustrated in FIG. 3.

Figure 9:
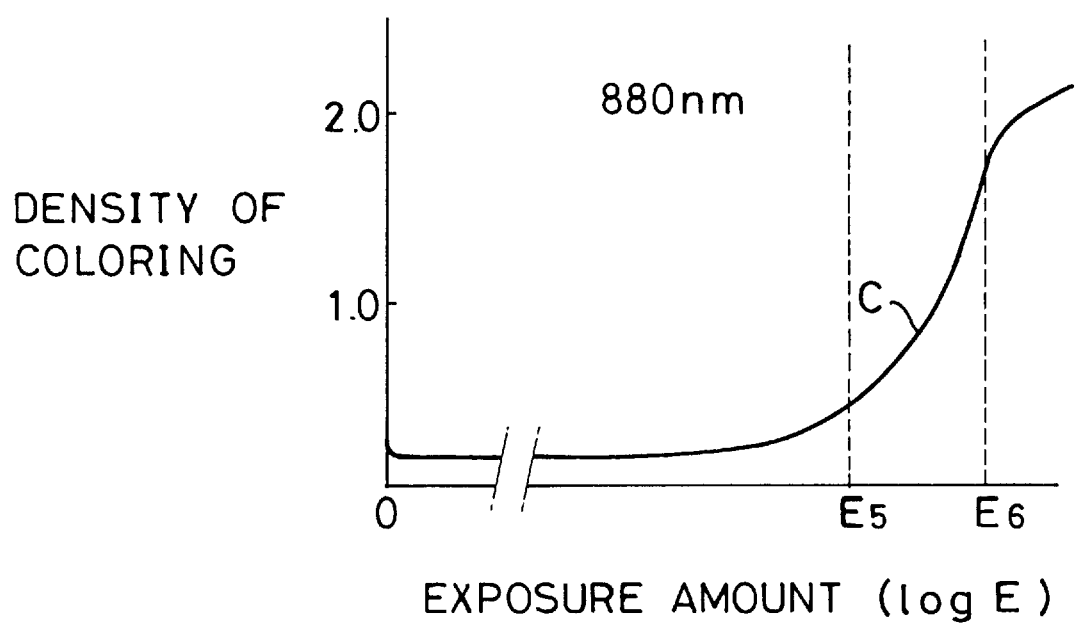
FIG. 9 is a graph showing the characteristics of a cyan coloring layer.

A chlorobromide silver emulsion layer 150b containing a cyan coupler can be used as the first layer. As shown in FIG. 9, this first layer 150b is sensitive to infrared light of 880 nm, and develops to a cyan color in the exposure amount range from E5 to E6.

A gelatin intermediate layer 150c can be used as the second layer.

Figure 10:
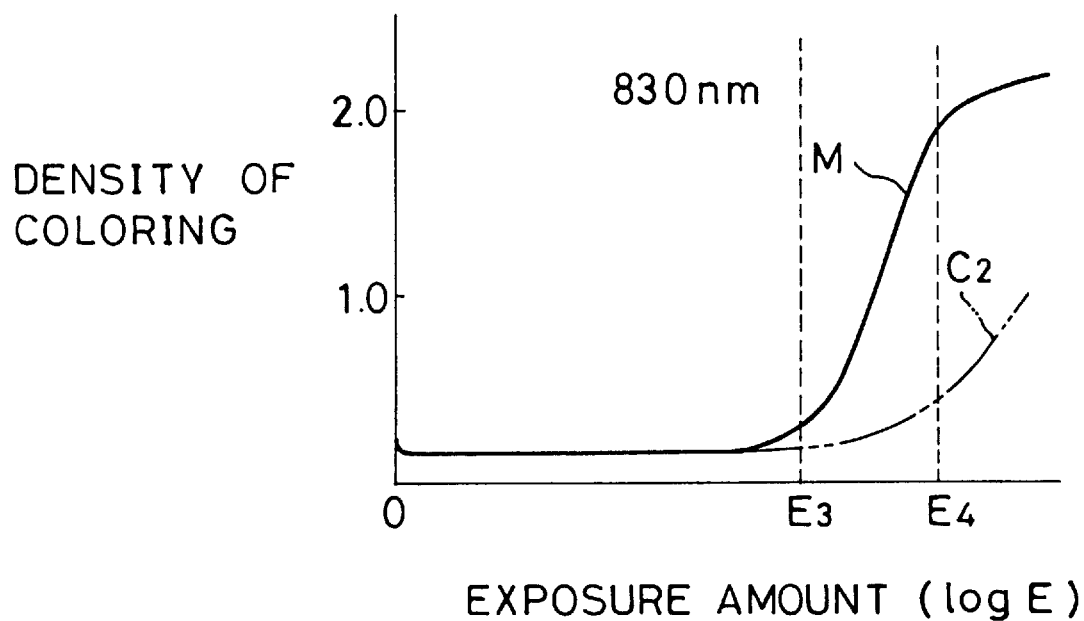
FIG. 10 is a graph showing the characteristics of a magenta coloring layer.

A chlorobromide silver emulsion layer 150d containing a magenta coupler can be used as the third layer. As shown in FIG. 10, this third layer 150d is sensitive to infrared light of 830 nm, and develops to a magenta color in the exposure amount range from E3 to E4. Within this exposure range from E3 to E4, a cyan color also develops as indicated at C2 in FIG. 10. However this density is very small relative to that of the magenta color, and color crosstalk seldom occurs.

A gelatin intermediate layer 150e can be used as the fourth layer.

Figure 11:
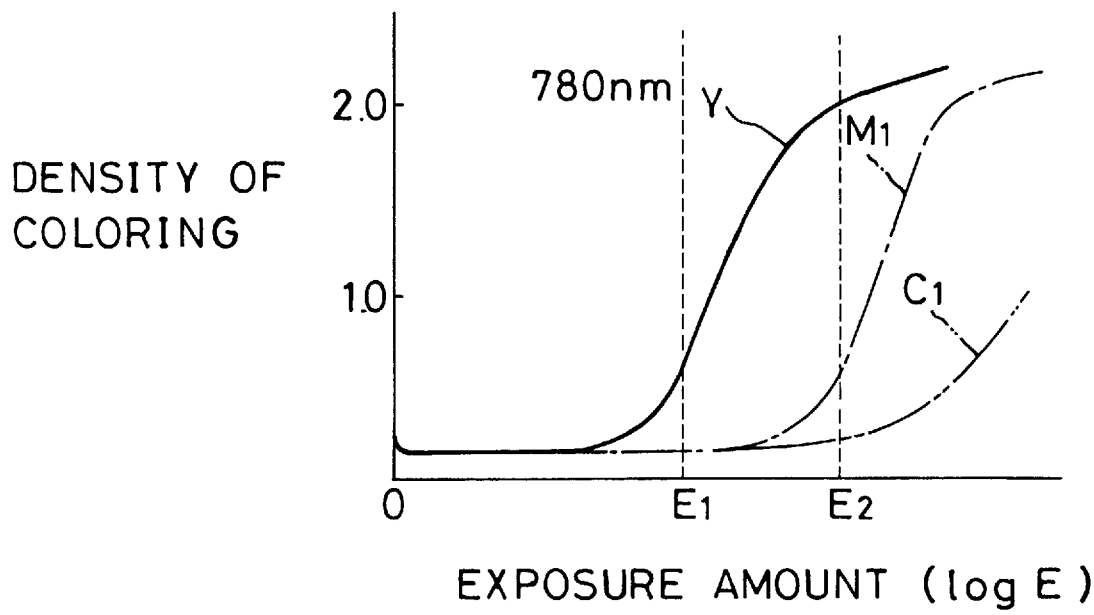
FIG. 11 is a graph showing the characteristics of a yellow coloring layer.

A chlorobromide silver emulsion layer 150f containing a yellow coupler can be used as the fifth layer. As shown in FIG. 11, this fifth layer 150f is sensitive to infrared light of 780 nm, and develops to a yellow color in the exposure amount range from E1 to E2. Within this exposure amount range from E1 to E2, magenta and cyan colors also develop as indicated at M1 and C1 in FIG. 11. However, color crosstalk can be neglected because the intensities of magenta and cyan are relatively low.

A gelatin intermediate layer 150g can be used as the sixth layer and a gelatin intermediate layer 150h can be used as the seventh layer.

In the above embodiment, trimming information is recorded on the magnetic recording layer loc of the negative film when photographing images or receiving a DP order, and the trimming printing is automatically carried out in accordance with the trimming information. Alternatively, trimming information may be entered from a keyboard, or the like, when inspecting the negative film or receiving a DP order. Such trimming information may also be written in an LSI card which is later placed in the photographic printer to perform the trimming printing. Furthermore, a keyboard may be mounted integrally with the photographic printer, in order to enter trimming information corresponding to each original frame. Trimming information may also be optically recorded on a photosensitive emulsion layer outside the original frame in the form of bar codes, KARURA codes, or the like.

In the above embodiment, the center of a trimming frame is fixed to the center of an original frame to perform trimming printing. However, trimming printing may be performed by designating the center of a trimming frame. In such a case, the trimming size designating information as well as the trimming frame center position information are recorded as the trimming information. The trimming area is determined by the area designating circuit 61 of the image processing unit 17, in accordance with the trimming frame position information.

In the above embodiment, image data of each original frame is read from the developed negative film. In the alternative, image data may be read during the washing process or during the time period between the washing process and drying process. It is therefore possible to perform the print process and paper developing process in parallel with the washing process and drying process. Accordingly it is possible to reduce the total process time starting from receiving a DP order to delivering finished photoprints. Accordingly, an urgent DP order by a customer can be handled in a shorter time, thus reducing a customer is waiting time.

The invention has been described through preferred embodiments. However, it will be apparent to those skilled in the art that various modifications can be made thereto without departing from the scope of the invention as defined by the appended claims.

I claim:

1. A photographic printer for making a photoprint by trimming an original frame on a photographic film and printing a trimmed image on a photosensitive material, comprising:

means for inputting trimming information;

image reading means for reading an original frame and generating first image data corresponding to said original image frame;

image processing means coupled to said image reading unit for processing said first image data and generating second image data corresponding to a trimmed image, said trimmed image being defined in accordance with said trimming information, said image processing means carrying out an enlargement process so that the length of one side of said trimmed image is substantially equal to a width of said photosensitive material; and a line printer unit coupled to said image processing means for printing said trimmed image one line after another on a photosensitive material, in accordance with said second image data.

2. A photographic printer according to claim 1, wherein said image reading unit comprising:

color line sensing means for reading said original frame one line after another synchronously with transportation of said photographic film and outputting said first image data including red, green, and blue image data.

3. A photographic printer according to claim 2, said inputting means comprising:

a magnetic head, disposed proximate said photographic film so as to read said trimming information recorded on a magnetic recording layer of said photographic film.

4. A photographic printer according to claim 3, said line printer unit comprising:

three types of light sources each radiating a light of a different wavelength range;

means for modulating the intensities of said three beams in accordance with said red, green, and blue image data respectively;

means for combining said modulated three beams into a single beam; and beam scanning means for scanning said combined single beam in the widthwise direction of said photosensitive material, which is transported at a constant speed, and recording said trimmed image, one line after another, on said photosensitive material.

5. A photographic printer according to claim 4, further comprising:

a first processor unit for developing said photosensitive material exposed by said line printer.

6. A photographic printer according to claim 5, further comprising:

a second processor unit for developing said photographic film, said image reading unit means and said magnetic head being mounted on said second processor unit.

7. A photographic printer according to claim 6, wherein, said second processor unit comprising:

film pull means for pulling said photographic film out of a film cassette which has been set in said film pull means.

8. A photographic printer according to claim 7, wherein said film cassette includes a cassette and a spool, and rotation of said spool causes a leader of said photographic film to advance outward.

9. A photographic printer according to claim 8, said film pull means comprises:

a film cassette setting station where said spool is rotated by being coupled with a drive shaft means for supplying said station with film cassettes in a serial fashion and means for ejecting an emptied film cassette from said film cassette setting station.

10. A photographic printer according to claim 9, wherein said three types of light sources are a red light laser for radiating a red laser beam, a green light laser for radiating a green laser beam, and a blue light laser for radiating a blue laser beam.

11. A photographic printer according to claim 9, said photosensitive material comprising a plurality of layers including cyan, magenta and yellow coloring layers, at least two of said coloring layers being sensitive to electromagnetic waves other than visible light.

12. A photographic printer according to claim 11, wherein said three coloring layers are each sensitive to infrared light of a wavelength range which is different from that of the others.

13. A photographic printer for making a photoprint of a trimmed image of an original image frame formed on a photographic film, comprising:

image reading means for reading said original frame and outputting first image data during a development process of said film;

image processing means coupled to said image reading unit for processing said first image data and generating second image data for exposing a photosensitive material, said photosensitive material comprising layers including cyan, magenta, and yellow coloring layers, at least two of said coloring layers being sensitive to electromagnetic waves other than visible light; and a line printer unit coupled to said image processing manes for scanning and exposing said photosensitive material in accordance with said second image data.

14. A photographic printer according to claim 13, said image reading unit comprising:

color line sensor means for reading said original frame one line after another synchronously with transportation of said photographic film, and outputting said first image data including red, green, and blue image data.

15. A photographic printer according to claim 14, further comprising:

a first processor unit for developing said photosensitive material after exposure by said line printer exposed.

16. A photographic printer according to claim 15, further comprising:

a second processor unit for developing said photographic film, said image reading unit being mounted on said second processor unit.

17. A photographic printer according to claim 13, further comprising:

means for inputting trimming information.

18. A photographic printer according to claim 17, said trimming information inputting means comprising:

a magnetic head disposed proximate said film so as to read said trimming information recorded on a magnetic recording layer of said photographic film.

19. A photographic printer according to claim 18, further comprising:

a first processor unit for developing said photosensitive material exposed by said line printer.

20. A photographic printer according to claim 19, further comprising:

a second processor unit for developing said photographic film, said image reading means and said magnetic head being mounted on said second processor unit to read said first image data and said trimming information during after a development process of said photographic film.

\* \* \* \* \*